US012364649B2

(12) United States Patent
Worrell et al.

(10) Patent No.: US 12,364,649 B2
(45) Date of Patent: Jul. 22, 2025

(54) FLOW CONTROL VALVE FOR INFANT FEEDING DEVICE

(71) Applicant: Proxamama, Inc.

(72) Inventors: Bob Worrell, Las Vegas, NV (US); Shilo Ben Zeev, Las Vegas, NV (US); Caleb Vainikka, Minneapolis, MN (US)

(73) Assignee: Proxamama, Inc., Las Vegas, NV (US)

( * ) Notice: Subject to any disclaimer, the term of this patent is extended or adjusted under 35 U.S.C. 154(b) by 0 days.

(21) Appl. No.: 18/464,832

(22) Filed: Sep. 11, 2023

(65) Prior Publication Data

US 2024/0065942 A1 Feb. 29, 2024

Related U.S. Application Data

(63) Continuation of application No. 18/052,506, filed on Nov. 3, 2022, now Pat. No. 11,793,727.

(60) Provisional application No. 63/400,314, filed on Aug. 23, 2022.

(51) Int. Cl.
*A61J 11/00* (2006.01)
*A61J 9/00* (2006.01)

(52) U.S. Cl.
CPC ............... *A61J 11/002* (2013.01); *A61J 9/00* (2013.01); *A61J 11/0035* (2013.01)

(58) Field of Classification Search
CPC ........... A61J 11/02; A61J 9/00; A61J 11/0035
See application file for complete search history.

(56) References Cited

U.S. PATENT DOCUMENTS 1,794,728 A * 3/1931 Oliver .................... A61J 11/001 215/11.1
2,984,377 A 5/1961 Biondi
5,688,238 A * 11/1997 Moser .................... A61J 11/045 606/236
7,210,591 B2 * 5/2007 Goldman .................. A61J 9/00 215/11.4
8,709,518 B2 * 4/2014 Young Jones ......... A61J 11/002 220/717
8,991,627 B2 3/2015 Vischer
11,793,727 B1 * 10/2023 Worrell ................ A61J 11/0035
2002/0063103 A1 5/2002 Kiernan
2005/0224444 A1 * 10/2005 Akihiro .................... A61J 11/02 215/11.1
2012/0248056 A1 10/2012 Fischer et al.

(Continued)

FOREIGN PATENT DOCUMENTS

CN 205234970 U 5/2016
WO 2004002276 A1 1/2004

*Primary Examiner* — Tri M Mai
(74) *Attorney, Agent, or Firm* — Greenberg Traurig, LLP

(57) ABSTRACT

A feeding device includes a fluid reservoir and a nipple configured to be attached to the fluid reservoir. The nipple includes a base portion and a teat portion, where the base portion and the teat portion together define an interior space of the nipple. The nipple also includes a removable flow valve configured to be positioned within the interior space of the nipple and an internal cavity between the removable flow valve and a wall of the nipple. The removable flow valve includes a central opening and at least one valve protrusion extending from a surface of the flow valve into the internal cavity. The removable flow valve is configured to adjust a flow rate of a fluid from the fluid reservoir into the internal cavity.

18 Claims, 11 Drawing Sheets

(56) References Cited

U.S. PATENT DOCUMENTS

| | | | | |
|---|---|---|---|---|
| 2020/0390657 | A1* | 12/2020 | Avshalomov ......... | A61J 9/0607 |
| 2021/0121397 | A1 | 4/2021 | Dente et al. | |

* cited by examiner

FLOW CONTROL VALVE FOR INFANT FEEDING DEVICE

FIELD OF INVENTION

The present disclosure relates generally to feeding devices for infants. Specifically, the present disclosure relates to feeding devices with flow control valves for infants.

BACKGROUND OF THE INVENTION

Feeding devices, such as baby bottles, are often used to feed babies from newborns to toddlers for various reasons. Reasons for using a feeding device include, but are not limited to: latching difficulties by the baby, inability for the mother to produce enough milk, feeding by a caregiver or physician other than the mother, inability for the mother to breastfeed for health reasons, weaning of the baby, etc.

SUMMARY OF THE INVENTION

The summary is a high-level overview of various aspects of the invention and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Embodiments of the present disclosure relate to a feeding device including a fluid reservoir. The device also includes a nipple configured to be attached to the fluid reservoir. The nipple includes a base portion and a teat portion. The base portion and the teat portion together define an interior space of the nipple. The nipple also includes a removable flow valve configured to be positioned within the interior space of the nipple. The nipple also includes an internal cavity between the removable flow valve and the nipple. The removable flow valve includes a central opening and at least one valve protrusion extending from a surface of the flow valve into the internal cavity. The removable flow valve is configured to adjust a flow rate of a fluid from the fluid reservoir into the internal cavity.

In some embodiments, the nipple includes an annular groove on an internal surface thereof configured to removably retain the flow valve therein.

In some embodiments, the flow valve and the annular groove form a fluid-tight seal.

In some embodiments, the flow includes a hard plastic ring defining an outer diameter of the flow valve and a soft over-molded layer.

In some embodiments, the at least one valve protrusion has a length of 5 mm to 9 mm.

In some embodiments, the at least one valve protrusion has a diameter of 1.5 mm to 2.0 mm.

In some embodiments, the at least one valve protrusion is randomly spaced on the surface of the flow valve.

In some embodiments, the nipple further includes at least one nipple protrusion extending proximally from an internal surface of a distal end of the teat portion.

In some embodiments, the at least one nipple protrusion has a length of 9 mm to 12 mm.

In some embodiments, the at least one nipple protrusion has a diameter of 1.2 mm to 1.5 mm.

Embodiments of the present disclosure also relate to a kit including at least two flow valves including varying flow rates. Each of the at least two flow valves includes a central opening having a diameter and at least one valve protrusion extending from a surface of each of the at least two flow valves. The kit also includes a feeding device including a fluid reservoir and a nipple configured to be attached to the fluid reservoir. The nipple includes a base portion and a teat portion. The base portion and the teat portion together define an interior space of the nipple. The nipple is configured to retain one of the at least two flow valves within the interior space of the nipple. An internal cavity is formed between the one of the at least two flow valves and the nipple. The at least two flow valves are configured to adjust the flow rate of fluid from the fluid reservoir into the internal cavity.

In some embodiments, a diameter of the central opening of each of the at least two flow valves is different from a diameter of other ones of the at least two flow valves.

In some embodiments, the nipple comprises an annular groove on an internal surface thereof configured to removably retain the one of the at least two flow valves therein.

In some embodiments, the one of the at least two flow valves and the annular groove form a fluid-tight seal.

In some embodiments, each of the at least two flow valves includes a hard plastic ring defining an outer diameter of the flow valve and a soft over-molded layer.

Embodiments of the present disclosure also relate to a nipple including a base portion and a teat portion. The base portion and the teat portion together define an interior space of the nipple. The nipple also includes a removable flow valve configured to be positioned within the interior space of the nipple. The nipple also includes an internal cavity between the removable flow valve and the nipple. The removable flow valve includes a central opening and at least one valve protrusion extending from a surface of the flow valve into the internal cavity. The removable flow valve is configured to adjust a flow rate of a fluid through the nipple.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the present disclosure.

DETAILED DESCRIPTION

Figure 1:
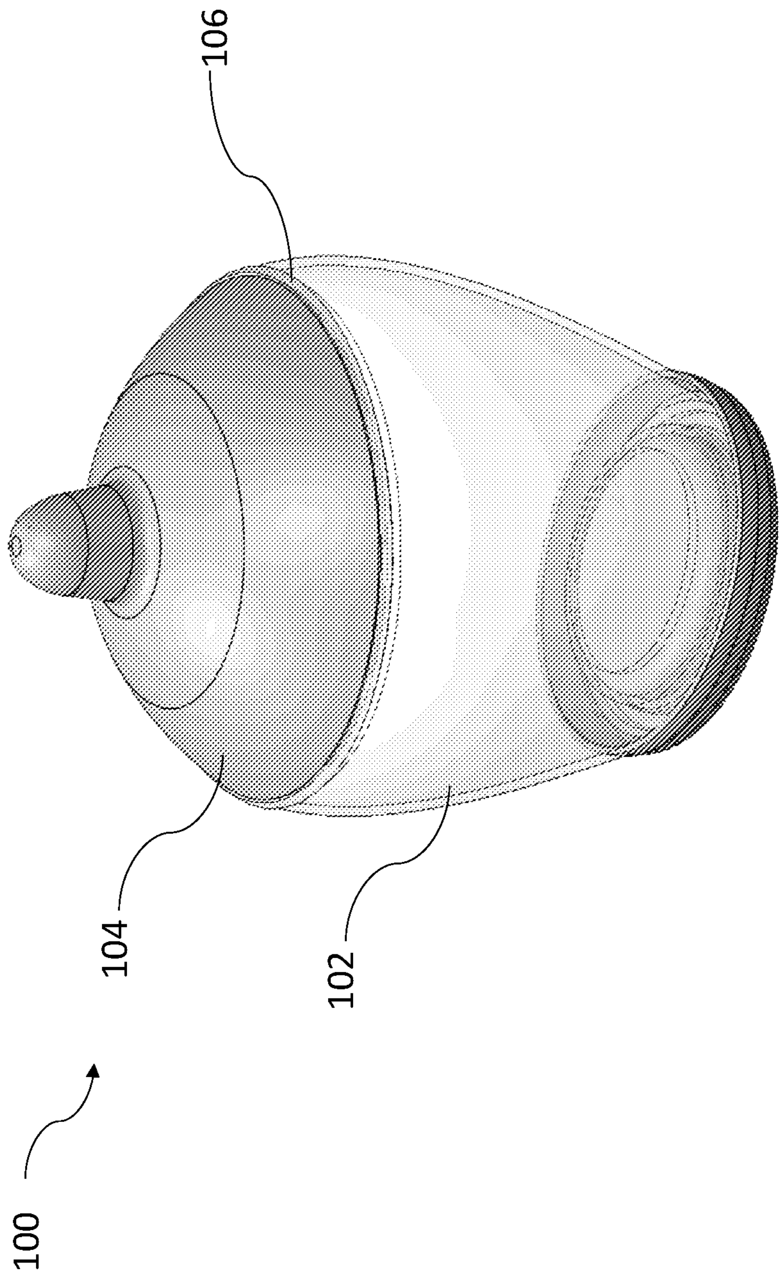
FIG. 1 is a perspective view of a feeding device, according to embodiments of the present disclosure.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments. Embodiment examples are described as follows with reference to the figures. Identical, similar, or identically acting elements in the various figures are identified with identical reference numbers and a repeated description of these elements is omitted in part to avoid redundancies. "Distal," as used herein, refers to the direction toward or nearer an infant end of the feeding device (i.e. a baby bottle) or other device. "Proximal," as used herein, refers to the direction toward or nearer a caregiver end of the feeding device.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "based on" is not exclusive and allows for being based on additional factors not described, unless the context clearly dictates otherwise. In addition, throughout the specification, the meaning of "a," "an," and "the" include plural references. The meaning of "in" includes "in" and "on." Spatial or directional terms, such as "left", "right", "inner", "outer", "above", "below", and the like, are not to be considered as limiting as the invention can assume various alternative orientations. All numbers used in the specification are to be understood as being modified in all instances by the term "about". The term "about" means a range of plus or minus ten percent of the stated value.

Unless otherwise indicated, all ranges or ratios disclosed herein are to be understood to encompass any and all subranges or sub-ratios subsumed therein. Unless otherwise indicated, all ranges or ratios herein are understood to be inclusive (i.e., to include both the minimum and maximum values of such ranges or ratios). For example, a stated range or ratio of "1 to 10" should be considered to include any and all subranges between (and inclusive of) the minimum value of 1 and the maximum value of 10; that is, all subranges or sub-ratios beginning with a minimum value of 1 or more and ending with a maximum value of 10 or less, such as but not limited to, 1 to 6.1, 3.5 to 7.8, and 5.5 to 10.

In some embodiments, the present disclosure relates to an infant feeding device with an interchangeable flow valve that allows for control of the flow of liquid from a fluid reservoir of the feeding device, through a nipple of the feeding device, and into an infant's mouth. In some embodiments, the flow valve is positioned inside the nipple of the feeding device, creating a fluid-tight seal. In some embodiments, the flow valve encapsulates the volume of fluid inside the fluid reservoir at a first side of the flow valve and simultaneously creates an internal cavity within the nipple, at a second side of the flow valve. In some embodiments, the fluid is able to enter the internal cavity of the nipple only via an opening in the flow valve.

In some embodiments, the present invention is a self-sanitizing product. In some embodiments, the present invention provides the ability to control flow using a bottle. In some embodiments, the present invention provides substantial relief to a mother when nipples are tender or sore in early days of breastfeeding. In some embodiments, the present invention substantially reduces and/or prevents an infant from developing nipple confusion or preference for a natural nipple versus a generic nipple. In some embodiments, the present invention is a pacifier.

In some embodiments, the product results in new mothers having the ability to procure nipples and pacifiers that are tailored to their newborns based on their own personal anatomy. For example, the product augments nursing a newborn with a custom nipple or pacifier to reduce "nipple confusion" and/or aid in nipple preference.

In some embodiments, the invention solves at least one the following problems: 18% of breastfeeding infants are unable or unwilling to drink from bottles; 83% of breastfeeding mothers report feeling criticized via looks of disapproval or derogatory remarks while nursing in public; 60% of breastfeeding mothers experience sore, cracked or bleeding nipples; 42% report infant trouble latching on in the first two weeks.

In some embodiments, the present disclosure relates to an infant feeding kit including an infant feeding device and three interchangeable flow valves with alternative openings. In some embodiments, each of the interchangeable flow valves have a different flow rate. In some embodiments each of the openings of the interchangeable flow valves have a different flow rate. In some embodiments, each of the interchangeable flow valves has a different number of openings, with each of the openings having the same diameter. In some embodiments, the infant feeding kit includes three flow valves: a first flow valve for infants aged 0 to 3 months, a second flow valve for infants aged 3 to 6 months and a third flow valve for infants aged 6 months and older.

In some embodiments, the nipple and/or pacifier will be composed of current FDA approved materials such as food grade silicone or latex.

In some embodiments, the geometry (e.g. structure, back pressure, valve) of the nipple results in a safe and effective nutritive sucking by an infant—the synchronous activities of sucking, swallow processing, and breathing.

In some embodiments, the geometry of the nipple results in the proper functioning of sucking, the swallow processing, and respiration needed to occur at two levels: first, the elements within each function must reach an appropriate functional maturation that can work in synchrony with each other to generate an appropriate suck, swallow process, and respiration; and second, the elements of all these distinct functions, in turn, must be able to do the same at an integrative level to ensure the safe and efficient transport of a bolus from the mouth to the stomach.

In some embodiments, the geometry of the nipples achieves the details described in the scientific journal, "Tongue movement and intra-oral vacuum in breastfeeding infants," Donna T. Geddes, Jacqueline C. Kent, Leon R. Mitoulas, Peter E. Hartmann (The University of Western Australia, Biochemistry and Molecular Biology, School of Biomedical, Biomolecular and Chemical Sciences, Faculty of Life and Physical Sciences, Australia Medical Research Coordinator, Medela AG, Medical Technology, Latichstrasse 4b, 6341 Baar, Switzerland) (Received 1 Feb. 2007; received in revised form 21 Aug. 2007; accepted 20 Dec. 2007). In some embodiments, the geometry of the nipple achieves: a) a mean breastfeed duration of 8 min 16 s±2 min 45 s with a mean milk intake of 63±31 g; b) a mean vacuum of −114±50 mmHg; c) a peak vacuum of −145±58 mmHg and baseline vacuum was −64±45 mmHg.

In some embodiments, the geometry of the nipple is configured so that the position of the nipple in the infant's mouth is both the tongue up and tongue down phase of the suck cycle which the peak and baseline vacuum applied by the infant.

The exemplary embodiments of the present invention are described and illustrated below to encompass valves, systems, and methods for regulating the flow of liquid through a feeding device.

Figure 2:
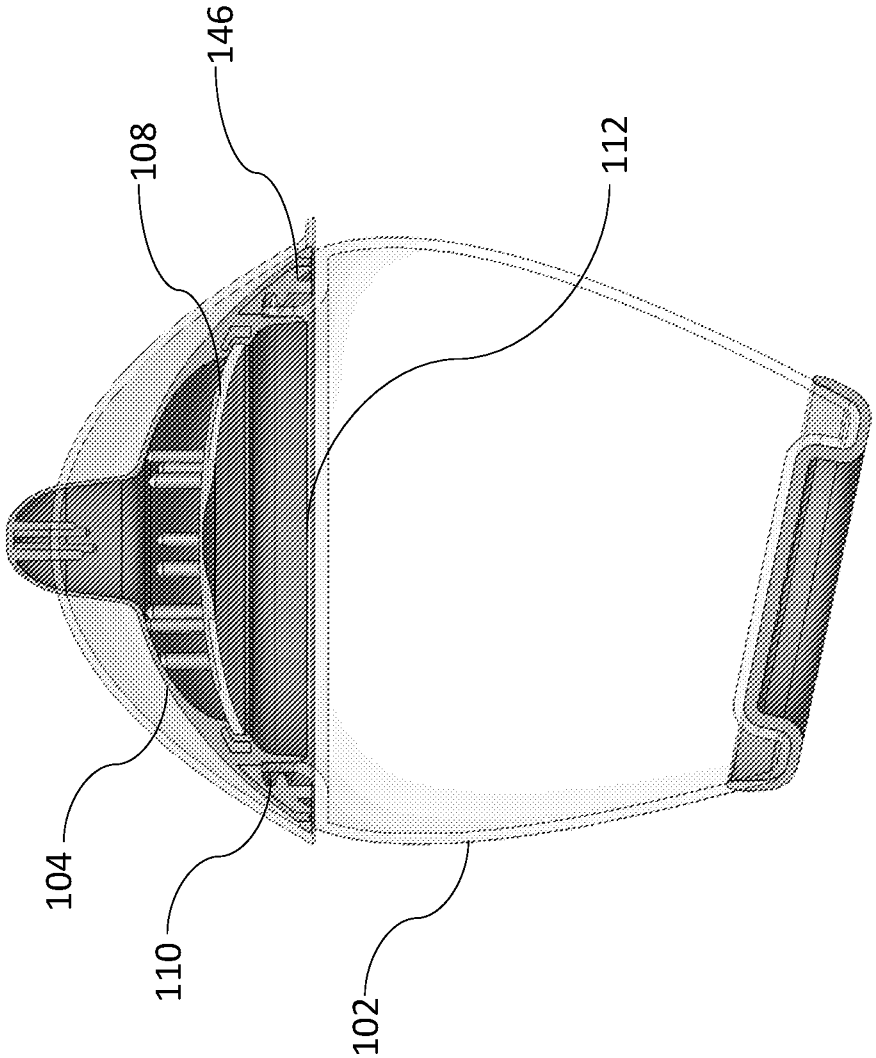
FIG. 2 is a cross-sectional view of the feeding device of FIG. 1, according to embodiments of the present disclosure.

Turning to FIGS. 1-2, a feeding device 100 according to a first embodiment of the present disclosure is depicted. In some embodiments, the feeding device 100 includes a fluid reservoir 102, a nipple 104 that is removably attachable to the fluid reservoir 102, and an interchangeable flow valve 108 that is insertable into the nipple 104. In some embodiments, the nipple 104 is removably attachable to the fluid reservoir 102 via a connecting collar 106.

In some embodiments, the fluid reservoir 102 is a bottle-type container frequently used for feeding infants. In some embodiments, the fluid reservoir is configured to house milk, formula or another liquid product for feeding an infant. In some embodiments, the fluid reservoir 102 is cylindrical. However, in other embodiments, the fluid reservoir may be any shape. The fluid reservoir 102, in some embodiments, is formed of a rigid material. In other embodiments, the fluid reservoir 102 is formed of a flexible material to allow compression of the fluid reservoir 102. In some embodiments, the fluid reservoir 102 can hold from 4 oz to 8 oz of fluid; or from 4 oz to 6 oz of fluid, or from 6 oz to 8 oz of fluid.

In some embodiments, the fluid reservoir 102 includes a neck portion 110 configured for coupling the fluid reservoir 102 to the nipple 104, as depicted in FIG. 2. In some embodiments, the neck portion 110 includes an opening 112 that is configured to allow flow of fluid from the fluid reservoir 102 to the nipple 104. In some embodiments, the fluid reservoir 102 comprises threading 146 extending outwardly from the neck portion 110.

Figure 3:
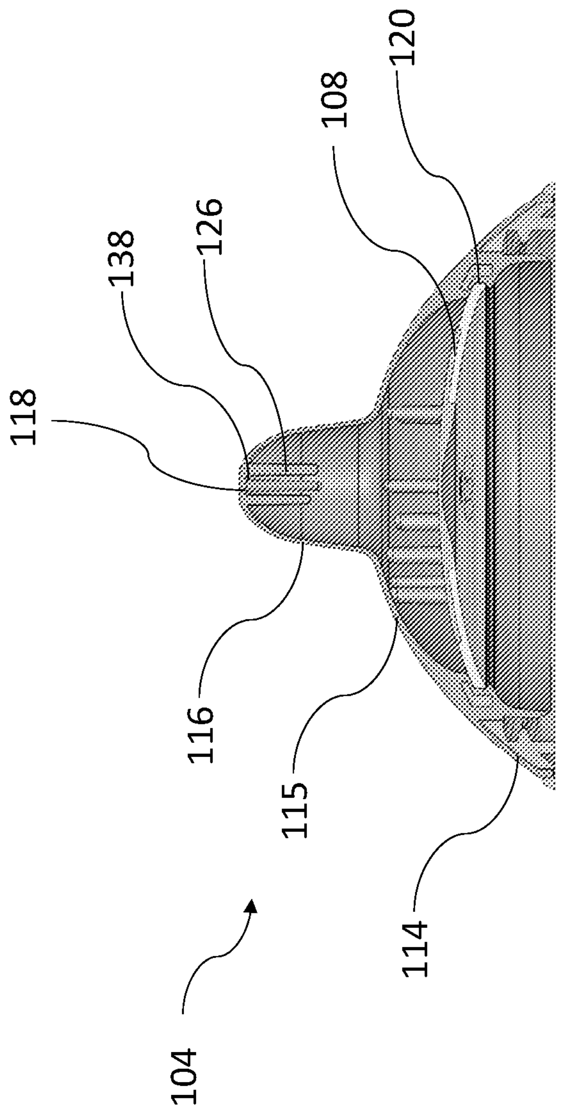
FIG. 3 is a cross-sectional view of a nipple including a flow valve, according to embodiments of the present disclosure.

FIG. 3 depicts an exemplary nipple 104, according to some embodiments of the present disclosure. In some embodiments, the nipple 104 is shaped to closely simulate the shape and look and shape of a mother's breast and nipple area. In some embodiments, the geometry of the nipple 104 is configured so as to result in a vacuum that reflects the seal formed on a mother's breast by an infant prior to active sucking. This seal is reflected in the small amount of movement of the nipple 104 when the infant applies vacuum by the downward movement of the tongue. In some embodiments, the nipple includes a base portion 114, an areola portion 115 and a teat portion 116. In some embodiments, the teat portion 116 is configured to be inserted into the mouth of an infant. In some embodiments, the nipple 104 includes at least one hole 118 at the distal end of the teat portion 116 through which fluid can pass, as depicted in FIG. 3. In some embodiments, the nipple 104 includes a groove 120 configured to hold the flow valve 108 within an interior space of the nipple 104, as will be described in further detail below.

In some embodiments, the nipple 104 includes at least one nipple protrusion 126 extending proximally from an interior surface 138 of the distal end of the teat portion 116 down into the interior space of the nipple 104, as depicted in FIG. 3. In some embodiments, the at least one nipple protrusion 126 simulates the feel of lactiferous ducts within the teat of a human nipple. In some embodiments, the at least one nipple protrusion 126 is formed from a flexible material such as, for example, silicone. In some embodiments, the nipple 104 includes 5 nipple protrusions 126. In some embodiments, the nipple 104 includes 4 to 7 nipple protrusions 126. In some embodiments, the nipple 104 includes 5 to 7 nipple protrusions 126. In some embodiments, the nipple 104 includes 6 to 7 nipple protrusions 126.

In some embodiments, the nipple 104 includes 4 to 6 nipple protrusions 126. In some embodiments, the nipple 104 includes 4 to 5 nipple protrusions 126. In some embodiments, the nipple 104 includes 5 to 6 nipple protrusions 126.

In some embodiments, the at least one nipple protrusion 126 is randomly positioned and spaced on the interior surface 138 of the distal end of the at teat portion 116. In some embodiments, each one of the at least one nipple protrusion 126 has varying lengths.

In some embodiments, each of the at least one nipple protrusions 126 has a diameter of 1.2 mm to 1.5 mm. In some embodiments, each of the at least one nipple protrusions 126 has a diameter of 1.25 mm to 1.5 mm. In some embodiments, each of the at least one nipple protrusions 126 has a diameter of 1.3 mm to 1.5 mm. In some embodiments, each of the at least one nipple protrusions 126 has a diameter of 1.4 mm to 1.5 mm.

In some embodiments, each of the at least one nipple protrusions 126 has a diameter of 1.2 mm to 1.4 mm. In some embodiments, each of the at least one nipple protrusions 126 has a diameter of 1.2 mm to 1.3 mm. In some embodiments, each of the at least one nipple protrusions 126 has a diameter of 1.2 mm to 1.25 mm.

In some embodiments, each of the at least one nipple protrusions 126 has a diameter of 1.3 mm to 1.4 mm. In some embodiments, each of the at least one nipple protrusions 126 has a diameter of 1.25 mm to 1.3 mm. In some embodiments, each of the at least one nipple protrusions 126 has a diameter of 1.24 mm to 1.4 mm.

In some embodiments, each of the at least one nipple protrusions 126 has a length of 9 mm to 12 mm. In some embodiments, each of the at least one nipple protrusions 126 has a length of 10 mm to 12 mm. In some embodiments, each of the at least one nipple protrusions 126 has a length of 11 mm to 12 mm.

In some embodiments, each of the at least one nipple protrusions 126 has a length of 9 mm to 11 mm. In some embodiments, each of the at least one nipple protrusions 126 has a length of 9 mm to 10 mm. In some embodiments, each of the at least one nipple protrusions 126 has a length of 10 mm to 11 mm.

In some embodiments, the material of the nipple 104 comprises a PVC plastic, latex or silicone-based material (e.g. silicone, copolymer of silicone, or medical grade silicone).

Figure 5:
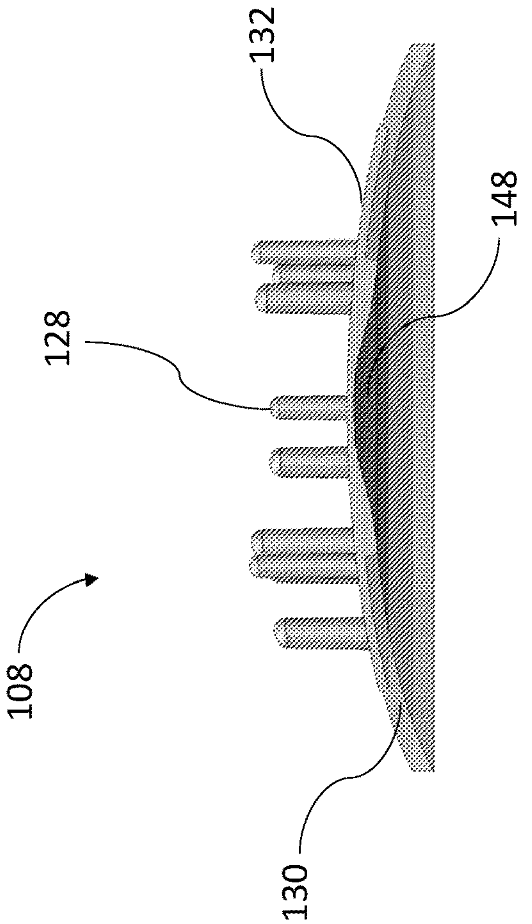
FIG. 5 is a cross-sectional view of a flow valve, according to embodiments of the present disclosure.
Figure 4:
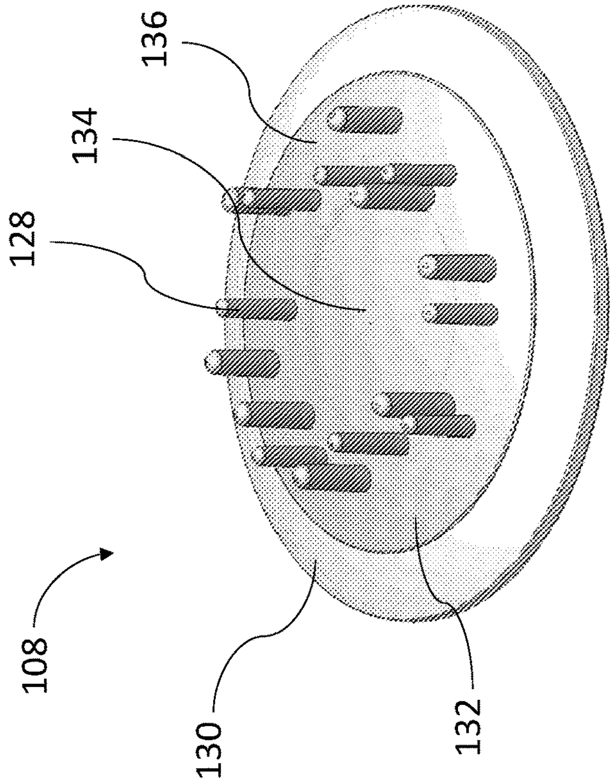
FIG. 4 is a perspective view of a flow valve, according to embodiments of the present disclosure.

FIGS. 4-5 depict an exemplary flow valve 108, according to embodiments of the present disclosure. In some embodiments, the rate of fluid flow through the feeding device 100 is controlled by the flow valve 108. In some embodiments, the flow valve 108 is configured to adjust the flow rate of fluid through the nipple to simulate a similar flow rate as the infant's mother during breast feeding. Thus, the flow valve 108 helps minimize nipple confusions. In some embodiments, the flow valve 108 is disc-shaped, as depicted in FIG. 4. In some embodiments, the flow valve 108 includes a hard plastic ring 130 overmolded with a flexible layer 132. In some embodiments, the flexible layer 132 covers a central aperture 148 of the hard plastic ring 130, as depicted in FIG. 5, to form the disc-shaped flow valve 108. Thus, in some embodiments, the flow valve 108 has a hard exterior ring and a soft central portion. In some embodiments, the flow valve 108 includes a central opening 134. In some embodiments, the flow valve 108 includes more than one central opening 134. For example, in the embodiments of FIG. 4, the flow valve 108 includes three central openings 134. In some embodiments, the central opening 134 controls the rate of fluid flow from the fluid reservoir 102 through the nipple 104 and out the teat portion 116.

In some embodiments, the hard plastic ring 130 is made from polyphenylsulfone. In some embodiments, the hard plastic ring 130 is made from other medical-grade plastics.

In some embodiments, the flexible layer 132 is made from silicone.

Figure 6:
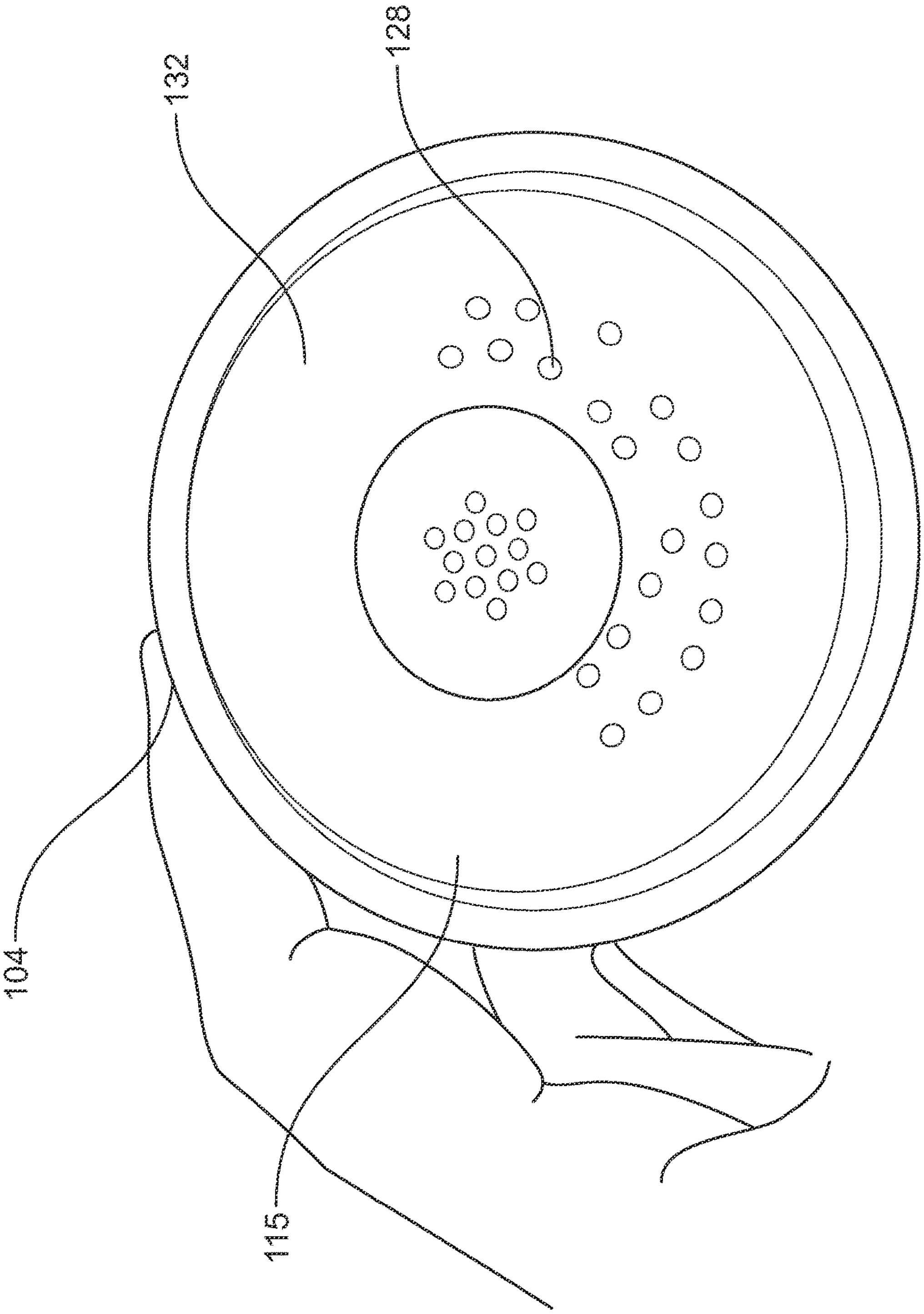
FIG. 6 is a top view of a nipple and flow valve, according to embodiments of the present disclosure.

In some embodiments, the flow valve 108 includes at least one valve protrusion 128 extending from a first surface 136 of the flexible layer 132, as depicted in FIGS. 4-5. In some embodiments, the at least one valve protrusion 128 supports an internal surface 150 of the nipple 104, as depicted in FIG. 3, helping to prevent the nipple from collapsing or inverting as the infant pushes up against the nipple to form a latch. In some embodiments, the at least one valve protrusion 128 also emulates the internal texture of a breast tissue. Often, current commercial nipples are hollow and require a higher durometer and thickness of silicone materials to prevent the nipple from collapsing. This higher durometer and thickness can give the nipple an unnatural feel as compared to natural breast tissue. Thus, the thinner material of the disclosed nipple 104, with the support of the at least one valve protrusion 128, provides a more natural feel. Additionally, the at least one valve protrusion 128 can be perceived through the translucent surface of the nipple, at the areola portion 115, emulating the Montgomery gland tubercles of human anatomy and creating a realistic visual portrayal of the human breast, as depicted in FIG. 6. Thus, the at least one valve protrusion 128 helps prevent nipple confusion. In some embodiments, the flexible layer 132 has 16 valve protrusions. In some embodiments, the flexible layer 132 has 12 to 24 valve protrusions 128. In some embodiments, the flexible layer 132 has 14 to 24 valve protrusions 128. In some embodiments, the flexible layer 132 has 16 to 24 valve protrusions 128. In some embodiments, the flexible layer 132 has 18 to 24 valve protrusions 128. In some embodiments, the flexible layer 132 has 20 to 24 valve protrusions 128. In some embodiments, the flexible layer 132 has 22 to 24 valve protrusions 128.

In some embodiments, the flexible layer 132 has 12 to 22 valve protrusions 128. In some embodiments, the flexible layer 132 has 12 to 20 valve protrusions 128. In some embodiments, the flexible layer 132 has 12 to 18 valve protrusions 128. In some embodiments, the flexible layer 132 has 12 to 16 valve protrusions 128. In some embodiments, the flexible layer 132 has 12 to 14 valve protrusions 128.

In some embodiments, the flexible layer 132 has 14 to 22 valve protrusions 128. In some embodiments, the flexible layer 132 has 14 to 20 valve protrusions 128. In some embodiments, the flexible layer 132 has 16 to 18 valve protrusions 128. In some embodiments, the flexible layer 132 has 16 to 22 valve protrusions 128. In some embodiments, the flexible layer 132 has 14 to 16 valve protrusions 128. In some embodiments, the flexible layer 132 has 14 to 18 valve protrusions 128. In some embodiments, the flexible layer 132 has 18 to 20 valve protrusions 128.

In some embodiments, the at least one valve protrusion 128 is formed from a flexible material such as, for example, silicone. In some embodiments, the at least one valve protrusion 128 is formed from the same material as the flexible layer 132. In some embodiments, the at least one valve protrusion 128 and the flexible layer 132 are formed as a unitary structure.

In some embodiments, each of the at least one valve protrusion 128 has a diameter of 1.5 mm to 2.0 mm. In some embodiments, each of the at least one valve protrusion 128 has a diameter of 1.6 mm to 2.0 mm. In some embodiments, each of the at least one valve protrusion 128 has a diameter of 1.7 mm to 2.0 mm. In some embodiments, each of the at least one valve protrusion 128 has a diameter of 1.8 mm to 2.0 mm. In some embodiments, each of the at least one valve protrusion 128 has a diameter of 1.9 mm to 2.0 mm.

In some embodiments, each of the at least one valve protrusion 128 has a diameter of 1.5 mm to 1.9 mm. In some embodiments, each of the at least one valve protrusion 128 has a diameter of 1.5 mm to 1.8 mm. In some embodiments, each of the at least one valve protrusion 128 has a diameter of 1.5 mm to 1.7 mm. In some embodiments, each of the at least one valve protrusion 128 has a diameter of 1.5 mm to 1.6 mm.

In some embodiments, each of the at least one valve protrusion 128 has a diameter of 1.6 mm to 1.9 mm. In some embodiments, each of the at least one valve protrusion 128 has a diameter of 1.7 mm to 1.9 mm. In some embodiments, each of the at least one valve protrusion 128 has a diameter of 1.8 mm to 1.9 mm. In some embodiments, each of the at least one valve protrusion 128 has a diameter of 1.6 mm to 1.8 mm. In some embodiments, each of the at least one valve protrusion 128 has a diameter of 1.7 mm to 1.8 mm. In some embodiments, each of the at least one valve protrusion 128 has a diameter of 1.6 mm to 1.7 mm.

In some embodiments, each of the at least one valve protrusion 128 has a length of 5 mm to 9 mm. In some embodiments, each of the at least one valve protrusion 128 has a length of 6 mm to 9 mm. In some embodiments, each of the at least one valve protrusion 128 has a length of 7 mm to 9 mm. In some embodiments, each of the at least one valve protrusion 128 has a length of 8 mm to 9 mm.

In some embodiments, each of the at least one valve protrusion 128 has a length of 5 mm to 8 mm. In some embodiments, each of the at least one valve protrusion 128 has a length of 5 mm to 7 mm. In some embodiments, each of the at least one valve protrusion 128 has a length of 5 mm to 6 mm.

In some embodiments, each of the at least one valve protrusion 128 has a length of 6 mm to 8 mm. In some embodiments, each of the at least one valve protrusion 128 has a length of 6 mm to 7 mm. In some embodiments, each of the at least one valve protrusion 128 has a length of 7 mm to 8 mm.

In some embodiments, the flow valve 108 is shaped and sized to be positioned within an interior space of the nipple 104, as depicted in FIGS. 2-3.

In some embodiments, the nipple 104 includes an annular groove 120 extending about an interior surface thereof, as depicted in FIG. 3. In some embodiments the annular groove 120 is configured to retain the flow valve 108 therein. In some embodiments, when the flow valve 108 is positioned within the annular groove 120, a fluid-tight seal is formed between the flow valve 108 and a wall 142 of the nipple, such that a fluid-tight internal cavity is formed. Because a fluid-tight seal is formed between the flow valve 108 and the nipple wall 142, fluid is only able to flow through the central opening 134 of the flow valve to the internal cavity 144. Thus, the rate of fluid flow depends on, and can be controlled by, the size of the central opening. In some embodiments, the flow valve 108 is inserted into the annular groove 120 by pressing the hard plastic ring 130 to fit into the annular groove 120.

In some embodiments, a diameter of the flow valve 108 is the same as, or slightly larger than a diameter of the annular groove 120, such that the flow valve 108 can be press-fit and retained in the annular groove 120. In some embodiments, the annular groove 120 has a diameter of 56.7 mm. In some embodiments, the annular groove 120 has a diameter of 50 mm to 60 mm. In some embodiments, the annular groove 120 has a diameter of 52 mm to 60 mm. In some embodiments, the annular groove 120 has a diameter of 54 mm to 60 mm. In some embodiments, the annular groove 120 has a diameter of 56 mm to 60 mm. In some embodiments, the annular groove 120 has a diameter of 58 mm to 60 mm.

In some embodiments, the annular groove 120 has a diameter of 50 mm to 58 mm. In some embodiments, the annular groove 120 has a diameter of 50 mm to 56 mm. In some embodiments, the annular groove 120 has a diameter of 50 mm to 54 mm. In some embodiments, the annular groove 120 has a diameter of 50 mm to 52 mm.

In some embodiments, the annular groove 120 has a diameter of 55 mm to 58 mm. In some embodiments, the annular groove 120 has a diameter of 53 mm to 56 mm. In some embodiments, the annular groove 120 has a diameter of 52 mm to 54 mm. In some embodiments, the annular groove 120 has a diameter of 56 mm to 58 mm.

In some embodiments, each central opening has a diameter of 0.15 mm. In some embodiments, each central opening has a diameter of 0.10 mm to 0.2 mm. In some embodiments, each central opening has a diameter of 0.12 mm to 0.2 mm. In some embodiments, each central opening has a diameter of 0.14 mm to 0.2 mm. In some embodiments, each central opening has a diameter of 0.15 mm to 0.2 mm. In some embodiments, each central opening has a diameter of 0.16 mm to 0.2 mm. In some embodiments, each central opening has a diameter of 0.18 mm to 0.2 mm.

In some embodiments, each central opening has a diameter of 0.10 mm to 0.18 mm. In some embodiments, each central opening has a diameter of 0.10 mm to 0.16 mm. In some embodiments, each central opening has a diameter of 0.10 mm to 0.15 mm. In some embodiments, each central opening has a diameter of 0.10 mm to 0.14 mm. In some embodiments, each central opening has a diameter of 0.10 mm to 0.12 mm.

In some embodiments, each central opening has a diameter of 0.12 mm to 0.18 mm. In some embodiments, each central opening has a diameter of 0.15 mm to 0.18 mm. In some embodiments, each central opening has a diameter of 0.15 mm to 0.16 mm. In some embodiments, each central opening has a diameter of 0.14 mm to 0.15 mm. In some embodiments, each central opening has a diameter of 0.12 mm to 0.16 mm.

In some embodiments, the present disclosure relates to a kit including a feeding device 100 and at least two interchangeable flow valves 108. In some embodiments, the kit includes three flow valves with differing flow rates. In some embodiments, each of the three flow valves has at least one central opening. In some embodiments, the flow valve 108 corresponding to infants ranging from ages 0 months to 3 months has a single central opening. In some embodiments, the flow valve 108 corresponding to infants ranging from 3 months to 6 months has two central openings. In some embodiments, the flow valve 108 corresponding to infants 6 months and older has three central openings. In some embodiments, each of the central openings has the same diameter such that, as more and more central openings are added to the flow valves 108, the fluid flow rate through the flow valves 108 increases.

In some embodiments, the flow rate through the 0-month to 3-month flow valve is 6 mL/min. In some embodiments, the flow rate through the 0-month to 3-month flow valve is 4 mL/min to 8 mL/min. In some embodiments, the flow rate through the 0-month to 3-month flow valve is 4 mL/min to 7 mL/min. In some embodiments, the flow rate through the 0-month to 3-month flow valve is 4 mL/min to 6 mL/min. In some embodiments, the flow rate through the 0-month to 3-month flow valve is 4 mL/min to 5 mL/min.

In some embodiments, the flow rate through the 0-month to 3-month flow valve is 5 mL/min to 8 mL/min. In some embodiments, the flow rate through the 0-month to 3-month flow valve is 6 mL/min to 8 mL/min. In some embodiments, the flow rate through the 0-month to 3-month flow valve is 7 mL/min to 8 mL/min.

In some embodiments, the flow rate through the 0-month to 3-month flow valve is 5 mL/min to 7 mL/min. In some embodiments, the flow rate through the 0-month to 3-month flow valve is 5 mL/min to 6 mL/min. In some embodiments, the flow rate through the 0-month to 3-month flow valve is 6 mL/min to 7 mL/min.

In some embodiments, the flow rate through the 3-month to 6-month flow valve is 9 mL/min. In some embodiments, the flow rate through the 3-month to 6-month flow valve is 7 mL/min to 11 mL/min. In some embodiments, the flow rate through the 3-month to 6-month flow valve is 8 mL/min to 11 mL/min. In some embodiments, the flow rate through the 3-month to 6-month flow valve is 9 mL/min to 11 mL/min. In some embodiments, the flow rate through the 3-month to 6-month flow valve is 10 mL/min to 11 mL/min.

In some embodiments, the flow rate through the 3-month to 6-month flow valve is 7 mL/min to 10 mL/min. In some embodiments, the flow rate through the 3-month to 6-month flow valve is 7 mL/min to 9 mL/min. In some embodiments, the flow rate through the 3-month to 6-month flow valve is 7 mL/min to 8 mL/min.

In some embodiments, the flow rate through the 3-month to 6-month flow valve is 8 mL/min to 10 mL/min. In some embodiments, the flow rate through the 3-month to 6-month flow valve is 8 mL/min to 9 mL/min. In some embodiments, the flow rate through the 3-month to 6-month flow valve is 9 mL/min to 10 mL/min.

In some embodiments, the flow rate through the 6 months and older flow valve is 12 mL/min. In some embodiments, the flow rate through the 6 months and older flow valve is 10 mL/min to 14 mL/min. In some embodiments, the flow rate through the 6 months and older flow valve is 11 mL/min to 14 mL/min. In some embodiments, the flow rate through the 6 months and older flow valve is 12 mL/min to 14 mL/min. In some embodiments, the flow rate through the 6 months and older flow valve is 13 mL/min to 14 mL/min.

In some embodiments, the flow rate through the 6 months and older flow valve is 10 mL/min to 13 mL/min. In some embodiments, the flow rate through the 6 months and older flow valve is 10 mL/min to 12 mL/min. In some embodiments, the flow rate through the 6 months and older flow valve is 10 mL/min to 11 mL/min.

In some embodiments, the flow rate through the 6 months and older flow valve is 11 mL/min to 13 mL/min. In some embodiments, the flow rate through the 6 months and older flow valve is 11 mL/min to 12 mL/min. In some embodiments, the flow rate through the 6 months and older flow valve is 12 mL/min to 13 mL/min.

Figure 7:
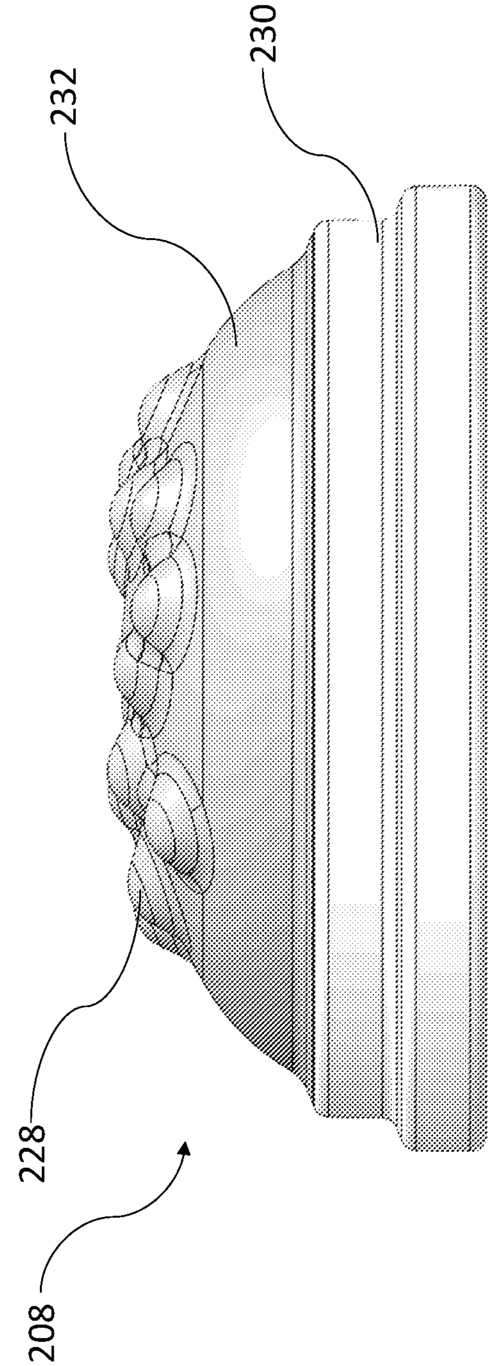
FIG. 7 is a side view of a flow valve, according to embodiments of the present disclosure.
Figure 8:
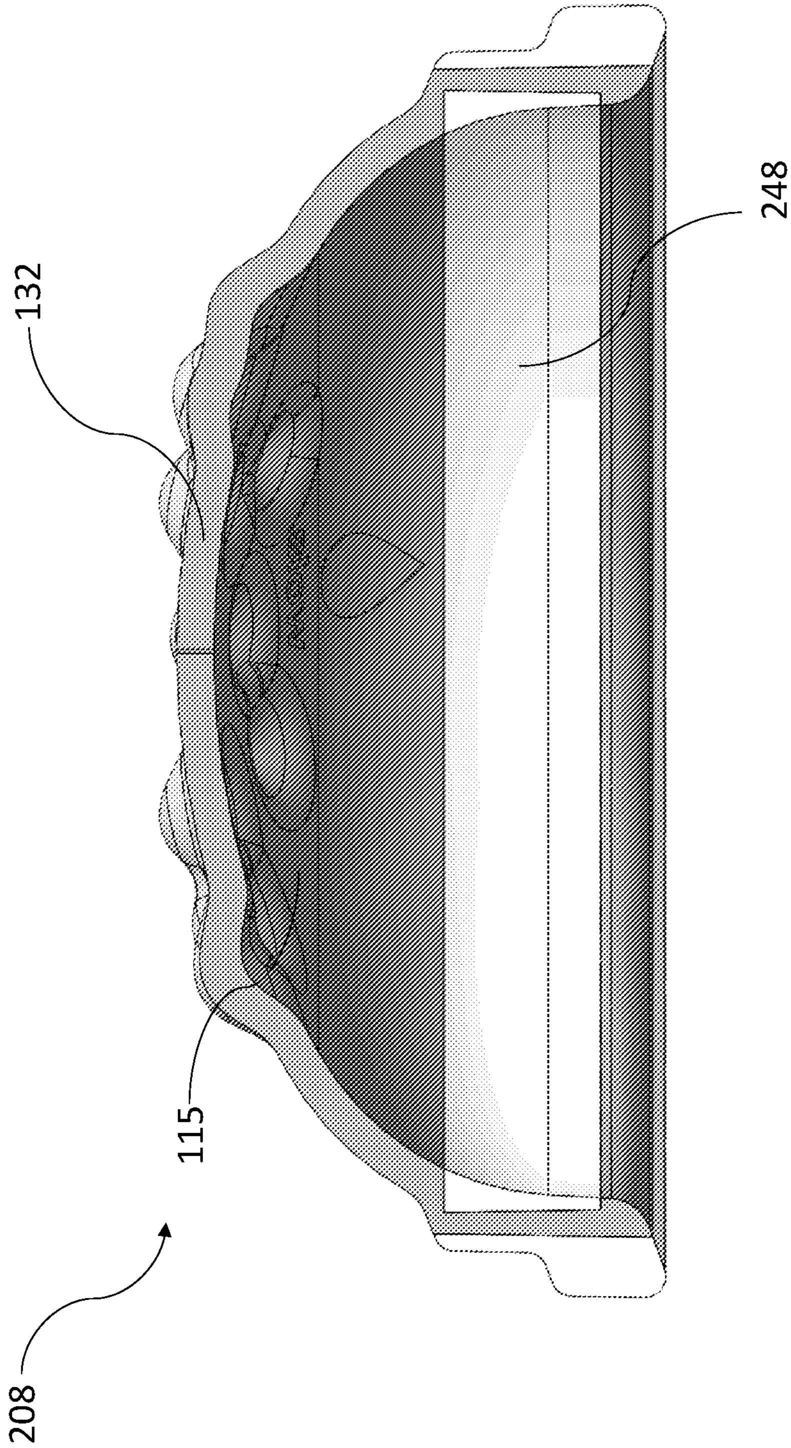
FIG. 8 is a cross-sectional view of the flow valve of FIG. 7, according to embodiments of the present disclosure.

FIGS. 7-10 depict an exemplary flow valve 208, according to embodiments of the present disclosure. In some embodiments, the rate of fluid flow through the feeding device 100 is controlled by the flow valve 208. In some embodiments, the flow valve 208 is configured to adjust the flow rate of fluid through the nipple to simulate a similar flow rate as the infant's mother during breast feeding. Thus, the flow valve 208 helps minimize nipple confusions. In some embodiments, the flow valve 208 is dome-shaped, as depicted in FIG. 7. In some embodiments, the flow valve 208 includes a hard plastic ring 230 overmolded with a flexible layer 232. In some embodiments, the flexible layer 232 covers a central aperture 248 of the hard plastic ring 230, as depicted in FIG. 8, to form the disc-shaped flow valve 208. Thus, in some embodiments, the flow valve 208 has a hard exterior ring and a soft central portion. In some embodiments, the flow valve 208 includes a central opening 234. In some embodiments, the flow valve 208 includes more than one central opening 234. In some embodiments, the central opening 234 controls the rate of fluid flow from the fluid reservoir 102 through the nipple 104 and out the teat portion 116.

In some embodiments, the hard plastic ring 230 is made from polyphenylsulfone. In some embodiments, the hard plastic ring 230 is made from other medical-grade plastics.

In some embodiments, the flexible layer 232 is made from silicone.

Figure 9:
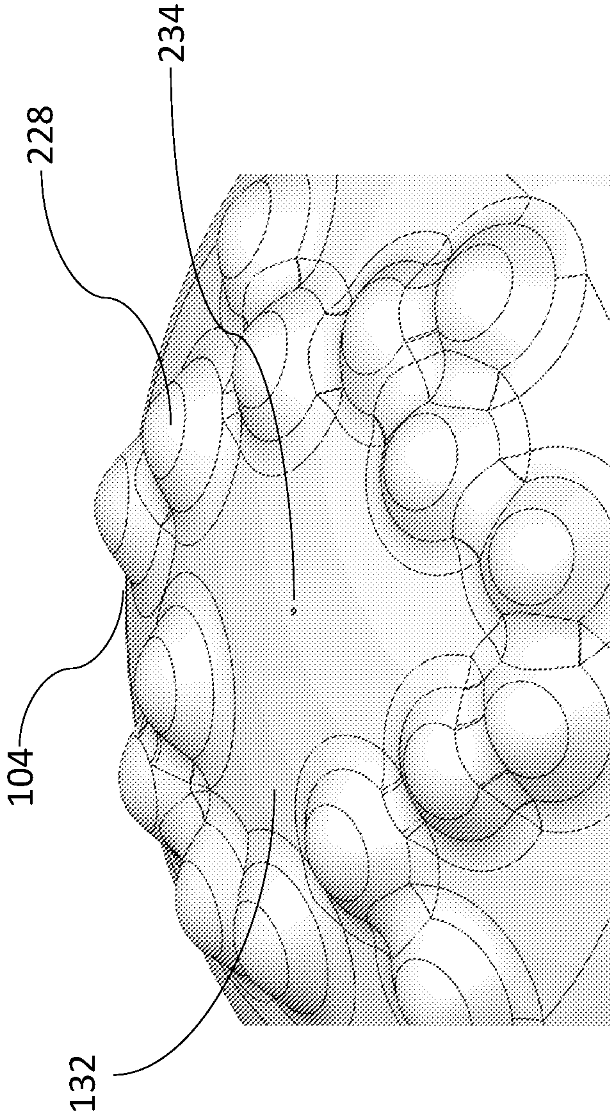
FIG. 9 is a perspective view of a flexible layer of the flow valve of FIG. 7, according to embodiments of the present disclosure.
Figure 10:
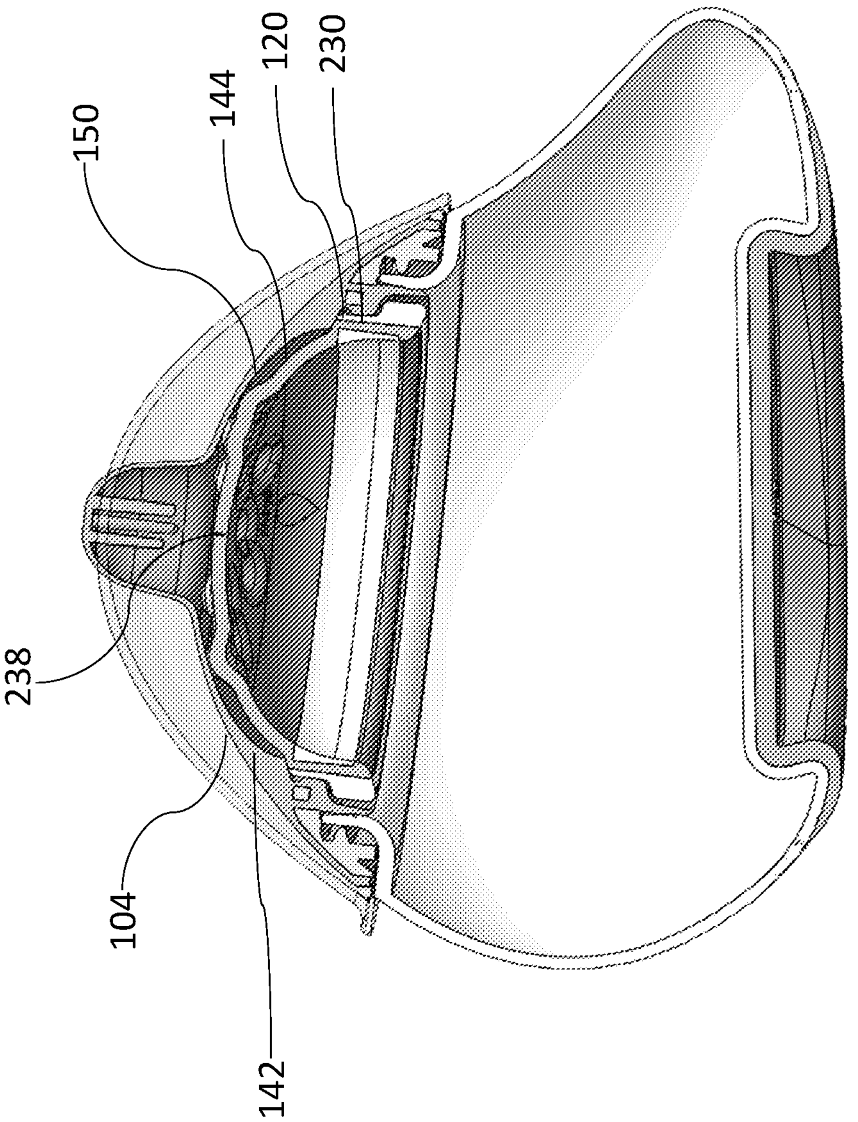
FIG. 10 is a cross-sectional view of a feeding device incorporating the flow valve of FIG. 7, according to embodiments of the present disclosure.

In some embodiments, the flexible layer 232 of the flow valve 208 has a wavy profile, as depicted in FIGS. 7 and 9, due to at least one bump or "nub" in the layer 232. In some embodiments, each of the at least one valve nub 228 is shaped as a bump or dome, as depicted in FIGS. 7-9. In some embodiments, the at least one valve nub 228 supports an internal surface 150 of the nipple 104, as depicted in FIG. 10, helping to prevent the nipple from collapsing or inverting as the infant pushes up against the nipple to form a latch. In some embodiments, the at least one valve nub 228 also emulates the internal texture and visual portrayal of a breast tissue, as described above with regard to the valve protrusions 128. Thus, the at least one valve nub 228 helps prevent nipple confusion.

In some embodiments, the flexible layer 232 has 16 valve nubs 228. In some embodiments, the flexible layer 232 has 12 to 24 valve nubs 228. In some embodiments, the flexible layer 232 has 14 to 24 valve nubs 228. In some embodiments, the flexible layer 232 has 16 to 24 valve nubs 228. In some embodiments, the flexible layer 232 has 18 to 24 valve nubs 228. In some embodiments, the flexible layer 232 has 20 to 24 valve nubs 228. In some embodiments, the flexible layer 232 has 22 to 24 valve nubs 228.

In some embodiments, the flexible layer 232 has 12 to 22 valve nubs 228. In some embodiments, the flexible layer 232 has 12 to 20 valve nubs 228. In some embodiments, the flexible layer 232 has 12 to 18 valve nubs 228. In some embodiments, the flexible layer 232 has 12 to 16 valve nubs 228. In some embodiments, the flexible layer 232 has 12 to 14 valve nubs 228.

In some embodiments, the flexible layer 232 has 14 to 22 valve nubs 228. In some embodiments, the flexible layer 232 has 14 to 20 valve nubs 228. In some embodiments, the flexible layer 232 has 16 to 18 valve nubs 228. In some embodiments, the flexible layer 232 has 16 to 22 valve nubs 228. In some embodiments, the flexible layer 232 has 14 to 16 valve nubs 228. In some embodiments, the flexible layer 232 has 14 to 18 valve nubs 228. In some embodiments, the flexible layer 232 has 18 to 20 valve nubs 228.

In some embodiments, the at least one valve nub 228 is formed from the same materials described above with regard to the at least one valve protrusion 128.

In some embodiments, each of the at least one valve nub 228 has a diameter of 2 mm to 5 mm. In some embodiments, each of the at least one valve nub 228 has a diameter of 2.5 mm to 5 mm. In some embodiments, each of the at least one valve nub 228 has a diameter of 3 mm to 5 mm. In some embodiments, each of the at least one valve nub 228 has a diameter of 3.5 mm to 5 mm. In some embodiments, each of the at least one valve nub 228 has a diameter of 4 mm to 5 mm. In some embodiments, each of the at least one valve nub 228 has a diameter of 4.5 mm to 5 mm.

In some embodiments, each of the at least one valve nub 228 has a diameter of 2 mm to 4.5 mm. In some embodiments, each of the at least one valve nub 228 has a diameter of 2 mm to 4 mm. In some embodiments, each of the at least one valve nub 228 has a diameter of 2 mm to 3.5 mm. In some embodiments, each of the at least one valve nub 228 has a diameter of 2 mm to 3 mm. In some embodiments, each of the at least one valve nub 228 has a diameter of 2 mm to 2.5 mm.

In some embodiments, each of the at least one valve nub 228 has a diameter of 2.5 mm to 4.5 mm. In some embodiments, each of the at least one valve nub 228 has a diameter of 2.5 mm to 4 mm. In some embodiments, each of the at least one valve nub 228 has a diameter of 2.5 mm to 3.5 mm. In some embodiments, each of the at least one valve nub 228 has a diameter of 2.5 mm to 3 mm. In some embodiments, each of the at least one valve nub 228 has a diameter of 3 mm to 4.5 mm. In some embodiments, each of the at least one valve nub 228 has a diameter of 3 mm to 4 mm. In some embodiments, each of the at least one valve nub 228 has a diameter of 3 mm to 3.5 mm. In some embodiments, each of the at least one valve nub 228 has a diameter of 3.5 mm to 4.5 mm. In some embodiments, each of the at least one valve nub 228 has a diameter of 3.5 mm to 4 mm. In some embodiments, each of the at least one valve nub 228 has a diameter of 4 mm to 4.5 mm.

In some embodiments, each of the at least one valve nub 228 has a length of 1 mm to 4 mm. In some embodiments, each of the at least one valve nub 228 has a length of 1.5 mm to 4 mm. In some embodiments, each of the at least one valve nub 228 has a length of 2 mm to 4 mm. In some embodiments, each of the at least one valve nub 228 has a length of 2.5 mm to 4 mm. In some embodiments, each of the at least one valve nub 228 has a length of 3 mm to 4 mm. In some embodiments, each of the at least one valve nub 228 has a length of 3.5 mm to 4 mm.

In some embodiments, each of the at least one valve nub 228 has a length of 1 mm to 3.5 mm. In some embodiments, each of the at least one valve nub 228 has a length of 1 mm to 3 mm. In some embodiments, each of the at least one valve nub 228 has a length of 1 mm to 2.5 mm. In some embodiments, each of the at least one valve nub 228 has a length of 1 mm to 2 mm. In some embodiments, each of the at least one valve nub 228 has a length of 1 mm to 1.5 mm.

In some embodiments, each of the at least one valve nub 228 has a length of 1.5 mm to 3.5 mm. In some embodiments, each of the at least one valve nub 228 has a length of 1.5 mm to 3 mm. In some embodiments, each of the at least one valve nub 228 has a length of 1.5 mm to 2.5 mm. In some embodiments, each of the at least one valve nub 228 has a length of 1.5 mm to 2 mm. In some embodiments, each of the at least one valve nub 228 has a length of 2 mm to 3.5 mm. In some embodiments, each of the at least one valve nub 228 has a length of 2 mm to 3 mm. In some embodiments, each of the at least one valve nub 228 has a length of 2 mm to 2.5 mm. In some embodiments, each of the at least one valve nub 228 has a length of 2.5 mm to 3.5 mm. In some embodiments, each of the at least one valve nub 228 has a length of 2.5 mm to 3 mm. In some embodiments, each of the at least one valve nub 228 has a length of 3 mm to 3.5 mm.

In some embodiments, the flow valve 208 is shaped and sized to be positioned within an interior space of the nipple 104, as depicted in FIG. 10.

In some embodiments, the flow valve 208 is positioned within the annular groove 120 of the nipple 104 in the same manner as the flow valve 108. Thus, in some embodiments, when the flow valve 208 is positioned within the annular groove 120, a fluid-tight seal is formed between the flow valve 208 and the wall 142 of the nipple, such that a fluid-tight internal cavity is formed. Because a fluid-tight seal is formed between the flow valve 208 and the nipple wall 142, fluid is only able to flow through the central opening 238 of the flow valve to the internal cavity 144. Thus, the rate of fluid flow depends on, and can be controlled by, the size of the central opening 238. In some embodiments, the flow valve 208 is inserted into the annular groove 120 by pressing the hard plastic ring 230 to fit into the annular groove 120.

In some embodiments, as describe above with regard to the flow valve 108, the diameter of the flow valve 208 is the same as, or slightly larger than a diameter of the annular groove 120, such that the flow valve 108 can be press-fit and retained in the annular groove 120.

In some embodiments, the present disclosure relates to a kit including a feeding device 100 and at least two interchangeable flow valves 208. In some embodiments, the kit includes three flow valves 208 with differing flow rates. In some embodiments, each of the three flow valves 208 has at least one central opening. In some embodiments, each of the three flow valves has a single central opening with varying diameters.

In some embodiments, a first one of the flow valves 208 corresponding to infants ranging from ages 0 months to 3 months has a central opening with a diameter of 0.18 mm to 0.22 mm. In some embodiments, the 0-3 month flow valve has a diameter of 0.19 mm to 0.22 mm. In some embodiments, the 0-3 month flow valve has a diameter of 0.20 mm to 0.22 mm. In some embodiments, the 0-3 month flow valve has a diameter of 0.21 mm to 0.22 mm.

In some embodiments, the 0-3 month flow valve has a diameter of 0.18 mm to 0.21 mm. In some embodiments, the 0-3 month flow valve has a diameter of 0.18 mm to 0.20 mm. In some embodiments, the 0-3 month flow valve has a diameter of 0.18 mm to 0.19 mm.

In some embodiments, the 0-3 month flow valve has a diameter of 0.19 mm to 0.21 mm. In some embodiments, the 0-3 month flow valve has a diameter of 0.19 mm to 0.2 mm. In some embodiments, the 0-3 month flow valve has a diameter of 0.20 mm to 0.21 mm.

In some embodiments, a second one of the flow valves 208 corresponding to infants ranging from ages 3 months to 6 months has a central opening with a diameter of 0.23 mm to 0.27 mm. In some embodiments, the 3-6 month flow valve has a diameter of 0.24 mm to 0.27 mm. In some embodiments, the 3-6 month flow valve has a diameter of 0.25 mm to 0.27 mm. In some embodiments, the 3-6 month flow valve has a diameter of 0.26 mm to 0.27 mm.

In some embodiments, the 3-6 month flow valve has a diameter of 0.23 mm to 0.26 mm. In some embodiments, the 3-6 month flow valve has a diameter of 0.23 mm to 0.25 mm. In some embodiments, the 3-6 month flow valve has a diameter of 0.23 mm to 0.24 mm.

In some embodiments, the 3-6 month flow valve has a diameter of 0.24 mm to 0.26 mm. In some embodiments, the 3-6 month flow valve has a diameter of 0.24 mm to 0.25 mm. In some embodiments, the 3-6 month flow valve has a diameter of 0.25 mm to 0.26 mm.

In some embodiments, a third one of the flow valves 208 corresponding to infants ranging from ages 6 months to 12 months has a central opening with a diameter of 0.28 mm to 0.32 mm. In some embodiments, the 6-12 month flow valve has a diameter of 0.29 mm to 0.32 mm. In some embodiments, the 6-12 month flow valve has a diameter of 0.30 mm to 0.32 mm. In some embodiments, the 6-12 month flow valve has a diameter of 0.31 mm to 0.32 mm.

In some embodiments, the 6-12 month flow valve has a diameter of 0.28 mm to 0.31 mm. In some embodiments, the 6-12 month flow valve has a diameter of 0.28 mm to 0.30 mm. In some embodiments, the 6-12 month flow valve has a diameter of 0.28 mm to 0.29 mm.

In some embodiments, the 6-12 month flow valve has a diameter of 0.29 mm to 0.31 mm. In some embodiments, the 6-12 month flow valve has a diameter of 0.29 mm to 0.30 mm. In some embodiments, the 6-12 month flow valve has a diameter of 0.30 mm to 0.31 mm.

In some embodiments, the flow rate through the 0-month to 3-month flow valve is 6 mL/min. In some embodiments, the flow rate through the 0-month to 3-month flow valve is 4 mL/min to 8 mL/min. In some embodiments, the flow rate through the 0-month to 3-month flow valve is 4 mL/min to 7 mL/min. In some embodiments, the flow rate through the 0-month to 3-month flow valve is 4 mL/min to 6 mL/min. In some embodiments, the flow rate through the 0-month to 3-month flow valve is 4 mL/min to 5 mL/min.

In some embodiments, the flow rate through the 0-month to 3-month flow valve is 5 mL/min to 8 mL/min. In some embodiments, the flow rate through the 0-month to 3-month flow valve is 6 mL/min to 8 mL/min. In some embodiments, the flow rate through the 0-month to 3-month flow valve is 7 mL/min to 8 mL/min.

In some embodiments, the flow rate through the 0-month to 3-month flow valve is 5 mL/min to 7 mL/min. In some embodiments, the flow rate through the 0-month to 3-month flow valve is 5 mL/min to 6 mL/min. In some embodiments, the flow rate through the 0-month to 3-month flow valve is 6 mL/min to 7 mL/min.

In some embodiments, the flow rate through the 3-month to 6-month flow valve is 9 mL/min. In some embodiments, the flow rate through the 3-month to 6-month flow valve is 7 mL/min to 11 mL/min. In some embodiments, the flow rate through the 3-month to 6-month flow valve is 8 mL/min to 11 mL/min. In some embodiments, the flow rate through the 3-month to 6-month flow valve is 9 mL/min to 11 mL/min. In some embodiments, the flow rate through the 3-month to 6-month flow valve is 10 mL/min to 11 mL/min.

In some embodiments, the flow rate through the 3-month to 6-month flow valve is 7 mL/min to 10 mL/min. In some embodiments, the flow rate through the 3-month to 6-month flow valve is 7 mL/min to 9 mL/min. In some embodiments, the flow rate through the 3-month to 6-month flow valve is 7 mL/min to 8 mL/min.

In some embodiments, the flow rate through the 3-month to 6-month flow valve is 8 mL/min to 10 mL/min. In some embodiments, the flow rate through the 3-month to 6-month flow valve is 8 mL/min to 9 mL/min. In some embodiments, the flow rate through the 3-month to 6-month flow valve is 9 mL/min to 10 mL/min.

In some embodiments, the flow rate through the 6 months and older flow valve is 12 mL/min. In some embodiments, the flow rate through the 6 months and older flow valve is 10 mL/min to 14 mL/min. In some embodiments, the flow rate through the 6 months and older flow valve is 11 mL/min to 14 mL/min. In some embodiments, the flow rate through the 6 months and older flow valve is 12 mL/min to 14 mL/min. In some embodiments, the flow rate through the 6 months and older flow valve is 13 mL/min to 14 mL/min.

In some embodiments, the flow rate through the 6 months and older flow valve is 10 mL/min to 13 mL/min. In some embodiments, the flow rate through the 6 months and older flow valve is 10 mL/min to 12 mL/min. In some embodiments, the flow rate through the 6 months and older flow valve is 10 mL/min to 11 mL/min.

In some embodiments, the flow rate through the 6 months and older flow valve is 11 mL/min to 13 mL/min. In some embodiments, the flow rate through the 6 months and older flow valve is 11 mL/min to 12 mL/min. In some embodiments, the flow rate through the 6 months and older flow valve is 12 mL/min to 13 mL/min.

In some embodiments, the nipple 104, when fully constructed, has a diameter of 3 in to 3.5 in; or 3.1 in to 3.5 in; or 3.2 in to 3.5 in; or 3.3 in to 3.5 in; or 3.4 in to 3.5 in; or 3 in to 3.4 in; or 3 in to 3.3 in; or 3 in to 3.2 in; or 3 in to 3.1 in; or 3.1 in to 3.4 in; or 3.2 in to 3.4 in; or 3.3 in to 3.4 in; or 3.2 in to 3.4 in; or 3.2 in to 3.3 in.

In some embodiments, the nipple 104 has a height (i.e., dimension from the bottom of the base portion 114 to the distal end of the teat portion 116) of 1.75 in to 2 in; or 1.8 in to 2 in; or 1.85 in to 2 in; or 1.9 in to 2 in; or 1.95 in to 2 in; or 1.75 in to 1.95 in; or 1.75 in to 1.9 in; or 1.75 in to 1.85 in; or 1.75 in to 1.8 in; or 1.8 in to 1.95 in; or 1.8 in to 1.9 in; or 1.8 in to 1.85 in; or 1.9 in to 1.95 in.

In some embodiments, the nipple 104 is wholly constructed via 3D printing. 3D printing provides a cost-efficient way to construct various component parts, such as the at least one nipple protrusion 126 and the at least one valve protrusion 128, which have dimensions that are so small as to be prohibitively expensive to produce by many other methods such as, for example, extrusion.

Figure 11:
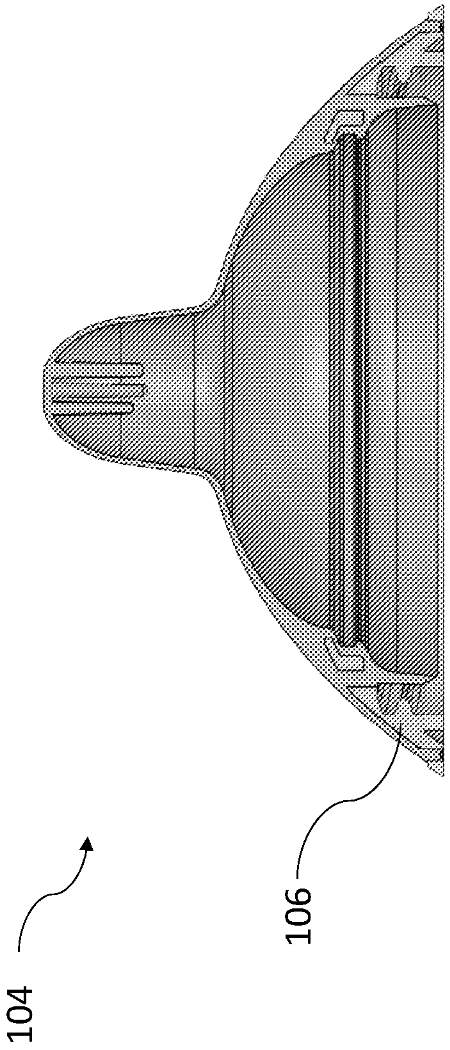
FIG. 11 is a perspective view of a nipple and connecting collar, according to embodiments of the present disclosure.
Figure 12:
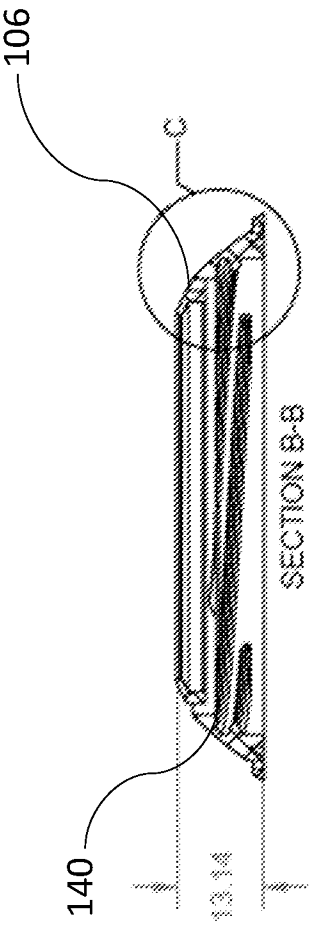
FIG. 12 is a cross-sectional view of a connecting collar, according to embodiments of the present disclosure.

In some embodiments, the connecting collar 106 serves to hold the nipple 104, with the flow valve 108 inserted therein, in place on the feeding device 100, as depicted in FIG. 11. In some embodiments, the connecting collar 106 includes an internal threading 140, as depicted in FIG. 12, configured to mate with the threading on the neck portion 110 of the fluid reservoir 102. In some embodiments, the nipple 104 is seated inside the connecting collar 106 and the connecting collar 106 is screwed on to the threading of the fluid reservoir 102 to fluidly seal the nipple 104 to the fluid reservoir 102, forming the enclosed feeding device 100. The final assembly of the feeding device 100 is best shown in FIGS. 2 and 10.

In some embodiments, the present disclosure relates to a kit including a feeding device 100 and at least two interchangeable flow valves 108. In some embodiments, the kit includes three flow valves 108 with differing flow rates. That is, in some embodiments, each of the three flow valves 108 has at least one central opening. In some embodiments, the flow valve 108 corresponding to infants ranging from ages 0 months to 3 months has a single central opening. In some embodiments, the flow valve 108 corresponding to infants ranging from 3 months to 6 months has two central openings. In some embodiments, the flow valve 108 corresponding to infants 6 months and older has three central openings. In some embodiments, each of the central openings has the same diameter such that, as more and more central openings are added to the flow valves 108, the fluid flow rate through the flow valves 108 increases.

In some embodiments, the artificial nipple structure is alternatively a pacifier closely resembling the actual nipple structure of a mother. The resulting nipple closely reproduces the active state nipple structure of a mother. For example, the pacifier may be printed as a one-piece article of manufacture on a base section including a plate with indentations to accommodate a baby's nose when the baby is sucking on nipple, together with a cylindrical base connected to grip ring.

The disclosure of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A feeding device comprising:

a fluid reservoir;

a nipple configured to be attached to the fluid reservoir;

a dome-shaped removable fluid flow valve configured to be positioned within an interior space of the nipple;

an internal cavity between the removable fluid flow valve and a wall of the nipple;

wherein the removable fluid flow valve comprises:

a plastic ring;

a flexible layer overmolded onto the plastic ring, wherein the flexible layer comprises 12 bumps to 24 bumps extending into the internal cavity such that the flexible layer comprises a wavy profile, wherein the plurality of bumps abut against the wall of the nipple to support the wall of the nipple;

a central opening having a diameter of diameter in the range of 0.1 mm to 0.32 mm; and wherein, when the removable fluid flow valve is positioned within the interior space of the nipple, the central opening is configured to control a flow rate of a fluid from the fluid reservoir into the internal cavity.

2. The device of claim 1, wherein the nipple comprises an annular groove extending about an internal surface of the nipple, and wherein the dome-shaped removable fluid flow valve is configured to be directly positioned within the annular groove.

3. The device of claim 2, wherein the dome-shaped removable flow valve and the annular groove form a fluid-tight seal.

4. The device of claim 1, wherein each bump of the plurality of bumps has a diameter of 2 mm to 5 mm.

5. The device of claim 1, wherein each bump of the plurality of bumps has a length of 1 mm to 4 mm.

6. The device of claim 1, wherein the plurality of bumps are randomly spaced on the flexible layer.

7. The device of claim 1, wherein the plastic ring comprises polyphenylsulfone.

8. A kit comprising:

at least two dome-shaped removable fluid flow valves comprising varying flow rates;

wherein each of the at least two dome-shaped removable fluid flow valves comprises:

a plastic ring;

a flexible layer overmolded onto the plastic ring, wherein the flexible layer comprises 12 bumps to 24 bumps such that the flexible layer comprises a wavy profile;

a central opening having a diameter of diameter in the range of 0.1 mm to 0.32 mm;

a feeding device comprising:

a fluid reservoir;

a nipple configured to be attached to the fluid reservoir, wherein the nipple is configured to retain one of the at least two dome-shaped removable fluid flow valves within an interior space of the nipple, wherein an internal cavity is formed between the one of the at least two removable fluid flow valves and the nipple, wherein the plurality of bumps extend into the internal cavity, wherein the plurality of bumps abut against a wall of the nipple to support the wall of the nipple, and wherein, when each of the at least two dome-shaped removable fluid flow valves are positioned within the interior space of the nipple, the central opening is configured to control a flow rate of a fluid from the fluid reservoir into the internal cavity.

9. The kit of claim 8, wherein each of the at least two removable fluid flow valves has a different number of central openings such that each of the at least two dome-shaped removable fluid flow valves has a different fluid flow rate.

10. The kit of claim 8, wherein each of the at least two dome-shaped removable fluid flow valves has a single central opening, wherein each of the central openings has a different diameter such that each of the at least two dome-shaped removable fluid flow valves has a different fluid flow rate.

11. The kit of claim 8, wherein each of the at least two dome-shaped removable fluid flow valves has more than one central opening, wherein each of the at least two dome-shaped removable fluid flow valves has a different fluid flow rate.

12. The kit of claim 8, wherein the nipple comprises an annular groove extending about an internal surface of the nipple, and wherein one of the at least two dome-shaped removable fluid flow valves is configured to be directly positioned within the annular groove.

13. The kit of claim 12, wherein the one of the at least two dome-shaped removable flow valves and the annular groove form a fluid-tight seal.

14. The kit of claim 8, wherein each bump of the plurality of bumps has a diameter of 2 mm to 5 mm.

15. The kit of claim 8, wherein each bump of the plurality of bumps has a length of 1 mm to 4 mm.

16. A nipple comprising:

a dome-shaped removable fluid flow valve configured to be positioned within an interior space of the nipple;

an internal cavity between the removable fluid flow valve and a wall of the nipple;

wherein the removable fluid flow valve comprises:

a plastic ring;

a flexible layer overmolded onto the plastic ring, wherein the flexible layer comprises 12 bumps to 24 bumps extending into the internal cavity such that the flexible layer comprises a wavy profile, wherein the plurality of bumps abut against the wall of the nipple to support the wall of the nipple;

a central opening having a diameter of diameter in the range of 0.1 mm to 0.32 mm; and wherein, when the removable fluid flow valve is positioned within the interior space of the nipple, the central opening is configured to control a flow rate of a fluid through the nipple.

17. The nipple of claim 16, further comprising and annular groove extending about an internal surface of the nipple, and wherein the dome-shaped removable fluid flow valve is configured to be directly positioned within the annular groove.

18. The nipple of claim 17, wherein the dome-shaped removable flow valve and the annular groove form a fluid-tight seal.

* * * * *